US010502178B2

(12) United States Patent
Guala et al.

(10) Patent No.: US 10,502,178 B2
(45) Date of Patent: Dec. 10, 2019

(54) IN-BANK VERITCAL AXIS HYDROPOWER SYSTEM (71) Applicant: REGENTS OF THE UNIVERSITY OF MINNESOTA, Minneapolis, MN (US)

(72) Inventors: Michele Guala, Minneapolis, MN (US); Jeffrey Marr, Minneapolis, MN (US); Lian Shen, Minneapolis, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 98 days.

(21) Appl. No.: 15/914,183

(22) Filed: Mar. 7, 2018

(65) Prior Publication Data
US 2018/0258903 A1 Sep. 13, 2018

Related U.S. Application Data (60) Provisional application No. 62/469,615, filed on Mar. 10, 2017.

(51) Int. Cl.
*F03B 17/06* (2006.01)
*F03B 7/00* (2006.01)
*F03B 13/00* (2006.01)

(52) U.S. Cl.
CPC .............. *F03B 7/00* (2013.01); *F03B 13/00* (2013.01); *F03B 17/063* (2013.01);
(Continued)

(58) Field of Classification Search
None
See application file for complete search history.

(56) References Cited

U.S. PATENT DOCUMENTS

| 4,095,422 A | 6/1978 | Kurakake | |
| 7,918,087 B1 * | 4/2011 | Brown | F03B 7/006 60/398 |

(Continued)

FOREIGN PATENT DOCUMENTS

CN 103925140 A 7/2014

OTHER PUBLICATIONS

Hong, J. et al. Natural snowfall reveals large-scale flow structures in the wake of a 2.5-MW wind turbine. Nat. Commun. 5:4216 doi: 10.1038/ncomms5216 (2014).

(Continued)

*Primary Examiner* — Michael Lebentritt
(74) *Attorney, Agent, or Firm* — Brian D. Kaul; Westman, Champlin & Koehler, P.A.

(57) ABSTRACT

A hydropower system for generating electrical energy from water flowing along a bank includes a shaft configured to rotate about a vertical axis, an electrical generator configured to generate electrical energy in response to rotation of the shaft, and a first hydrokinetic device including a plurality of blades attached to the shaft and angularly displaced from each other around the axis. A portion of the first hydrokinetic device is submerged in the water within a cavity formed in the bank, and a portion of the first hydrokinetic device extends outside the cavity and is submerged within the flowing water. The flowing water pushes on the blades located outside the cavity, which drives rotation of the first hydrokinetic device and the shaft about the axis.

20 Claims, 5 Drawing Sheets (52) U.S. Cl.
CPC ....... *F05B 2240/24* (2013.01); *F05B 2240/30* (2013.01); *F05B 2240/91* (2013.01); *Y02E 10/223* (2013.01)

(56) References Cited

U.S. PATENT DOCUMENTS

| | | | | |
|---|---|---|---|---|
| 8,102,068 | B1* | 1/2012 | Gutekunst | F03B 17/063 290/42 |
| 8,801,359 | B2* | 8/2014 | Sherrer | F03B 3/18 415/1 |
| 9,000,604 | B2* | 4/2015 | Sireli | F03B 11/02 290/54 |
| 9,835,130 | B1* | 12/2017 | McKinley | F03B 17/06 |
| 2008/0148723 | A1* | 6/2008 | Birkestrand | E02B 9/00 60/327 |
| 2012/0098266 | A1 | 4/2012 | Fransen | |

OTHER PUBLICATIONS

Chamorro, L. et al. Interactions between turbulent open channel flow, power and the wake of an axial-flow marine turbine. Retrieved from https://pdfs.semanticscholar.org/e517/a11cbeffcc46c29d018fce31acf7e0272f65.pdf (2018).

Hill C, Kozarek J. Sotiropoulos F., Guala M. (2016). Hydrodynamics and sediment transport in a meandering channel with a model axial flow hydrokinetic turbine Water Resources Research 52 (2), 860-879.

Hill C., Musa M, Chamorro L.P., Ellis C., and Guala M. (2014). Local Scour around a Model Hydrokinetic Turbine in an Erodible Channel. Journal of Hydraulic Engineering 140 (8), 04014037.

Musa M., Heisel M., Guala M. (2018). Predictive model for local scour downstream of hydrokinetic turbines in erodible channels. Physical Review Fluids 3 (2), 024606.

Hill C., Musa M., and Guala M. (2016) Interaction between instream axial flow hydrokinetic turbines and uni-directional flow bedforms. Renewable Energy 86, 409-421.

Odgaard A.J. and Mosconi (1987). Streambank Protection by Submerged Vanes (1987) M. Journal of Hydraulic Engineering vol. 113, Issue 4.

Kang S. Yang X., Sotiropoulos F. (2014) On the onset of wake meandering for an axial flow turbine in a turbulent open channel flow., J. Fluid Mech. 744.

Howard K., Guala M. (2016). Upwind preview to a horizontal axis wind turbine: a wind tunnel and field-scale study, Wind Energy 19 (8), 1371-1389.

Chawdary S. Hill C. , Guala M., Corren D., Colby J. and Sotiropoulos F. (2017) Wake characteristics of a tri-frame of axial flow hydrokinetic turbines. Renewable Energy 109, 332-345.

Chamorro et al (2013). On the interaction between a turbulent open channel flow and an axial-flow turbine, J. Fluid Mech. 716.

Guala M., Singh A., Bad Heart Bull N., Foufoula-Georgiou E. (2014). Spectral description of migrating bed forms and sediment transport Journal of Geophysical Research: Earth Surface 119 (2), 123-137.

Blondeaux B., G Seminara G. (1985) A unified bar—bend theory of river meanders Journal of Fluid Mechanics 157, 449-470.

S. Kiho (1996). "The power generation from tidal currents by darrieus turbine" Renewable Energy, 9, Issues 1-4, 1242-1245.

McComiskie, Rodney (2014). State of the Tropics—201—Report. James Cook University.

* cited by examiner

IN-BANK VERITCAL AXIS HYDROPOWER SYSTEM

CROSS-REFERENCE TO RELATED APPLICATION

The present application claims the benefit of U.S. provisional patent application Ser. No. 62/469,615, filed Mar. 10, 2017, the content of which is hereby incorporated by reference in its entirety.

BACKGROUND

Embodiments of the present disclosure are directed to a vertical axis hydropower system that may be installed along the bank of a river or channel, bridge piers, or side walls of existing hydraulic structures like bridge abutment, and spillways, for example.

Hydropower systems use the kinetic energy of water currents to generate electrical energy. These technologies represent an extremely viable opportunity to access clean and renewable energy from rivers, waves, and tidal currents. Utility scale technologies are capable of generating hundreds of kilowatts of energy, but also require large channels and flow volumes. Several of these projects have ongoing/high profile demonstration projects in large tidal channels including the East River in New York, the Juan de Fuca Strait Channel near Seattle, Wash., and the Chankoo Channel near Conception, Chile. These large systems have substantial technological and environmental barriers to overcome before measurable penetration of the technologies are realized.

Given that 900 million people in the tropics did not have access to electricity in 2010, harnessing energy from local streams and irrigation channels would have applicability on a global scale (McComiskie 2014). In addition to the need for alternative energy in underdeveloped communities, there is growing demand for low-impact renewable energy in developed economies. Specifically, in pristine, protected environments such as national parks or remote communities, local renewable energy is an attractive option, but current technologies often have non-negligible ecological impact, or may require massive power transmission costs.

There is a need for a hydropower system that is capable of producing electricity from hydrokinetic energy of water flows in streams and channels that has a low environmental impact, can adjust to flow variability, and can contribute to protecting stream-banks and preventing bank erosion.

SUMMARY

Embodiments of the present disclosure are directed to hydropower systems for generating electrical energy from water flowing along a bank, and methods of generating electrical energy from water flowing along a bank using the systems. One embodiment of the hydropower system includes a shaft configured to rotate about a vertical axis, an electrical generator configured to generate electrical energy in response to rotation of the shaft, and a first hydrokinetic device including a plurality of blades attached to the shaft and angularly displaced from each other around the axis. A portion of the first hydrokinetic device is submerged in the water within a cavity formed in the bank, and a portion of the first hydrokinetic device extends outside the cavity and is submerged within the flowing water. The flowing water pushes on the blades located outside the cavity, which drives rotation of the first hydrokinetic device and the shaft about the axis. The transfer of the kinetic energy from the water flowing along the bank into the rotation of the first hydrokinetic device about the axis reduces the velocity of the water flow along the bank, thereby reducing shear forces along the bank. As a result, the system protects the bank by reducing erosive forces along the bank caused by the flowing water.

In one embodiment of the method, a first hydrokinetic device having a plurality of blades is supported within the water along the bank. A portion of the first hydrokinetic device is submerged in the water within a cavity formed in the bank, and a portion of the first hydrokinetic device extends outside the cavity and is submerged within the flowing water. Rotation of the first hydrokinetic device is driven about a vertical axis in response to the flowing water pushing on the blades of the portion of the first hydrokinetic device located outside the cavity. A shaft attached to the first hydrokinetic device is rotated in response to driving rotation of the first hydrokinetic device. Electrical energy is generated using an electrical generator in response to the rotation of the shaft. Erosive forces along the bank are reduced by reducing a velocity of the flowing water in response to the rotation of the first hydrokinetic device about the vertical axis.

DETAILED DESCRIPTION OF ILLUSTRATIVE EMBODIMENTS

Embodiments of the present disclosure are described more fully hereinafter with reference to the accompanying drawings. Elements that are identified using the same or similar reference characters refer to the same or similar elements. The various embodiments of the present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art.

Figure 1:
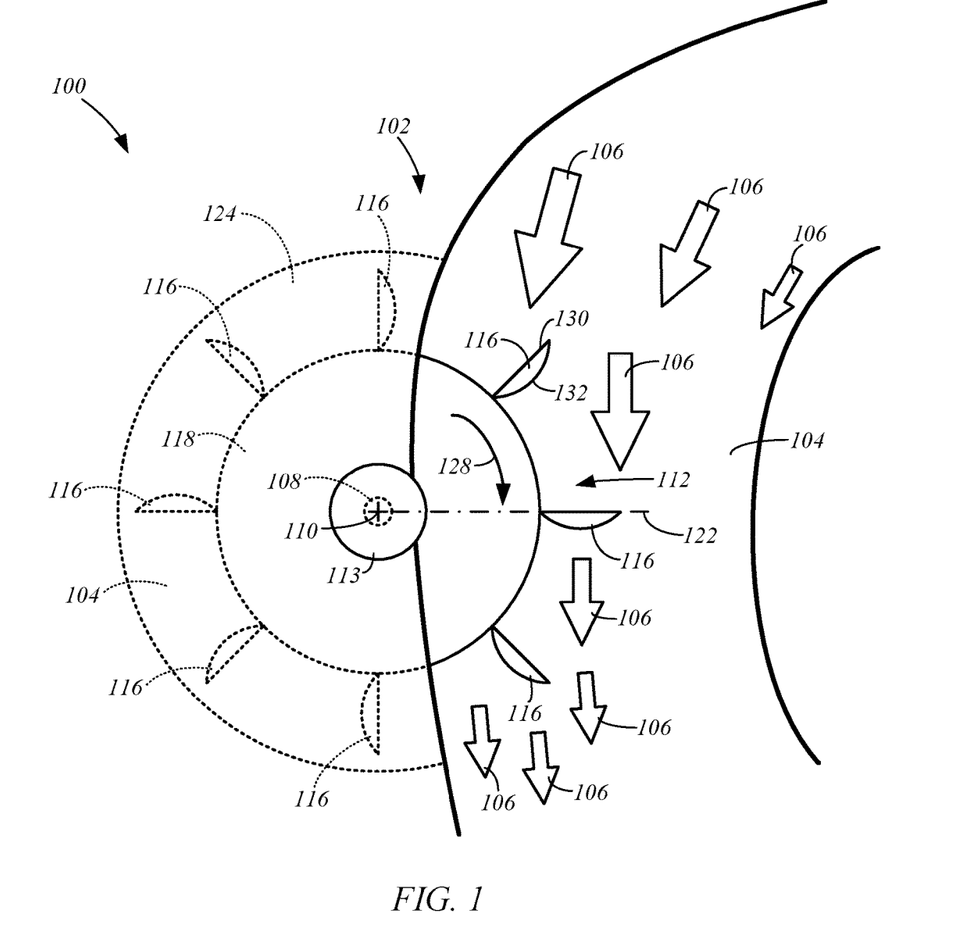
FIG. 1 is a simplified top view of an exemplary hydropower system installed along a bank of a water flow, in accordance with embodiments of the present disclosure.
Figure 2:
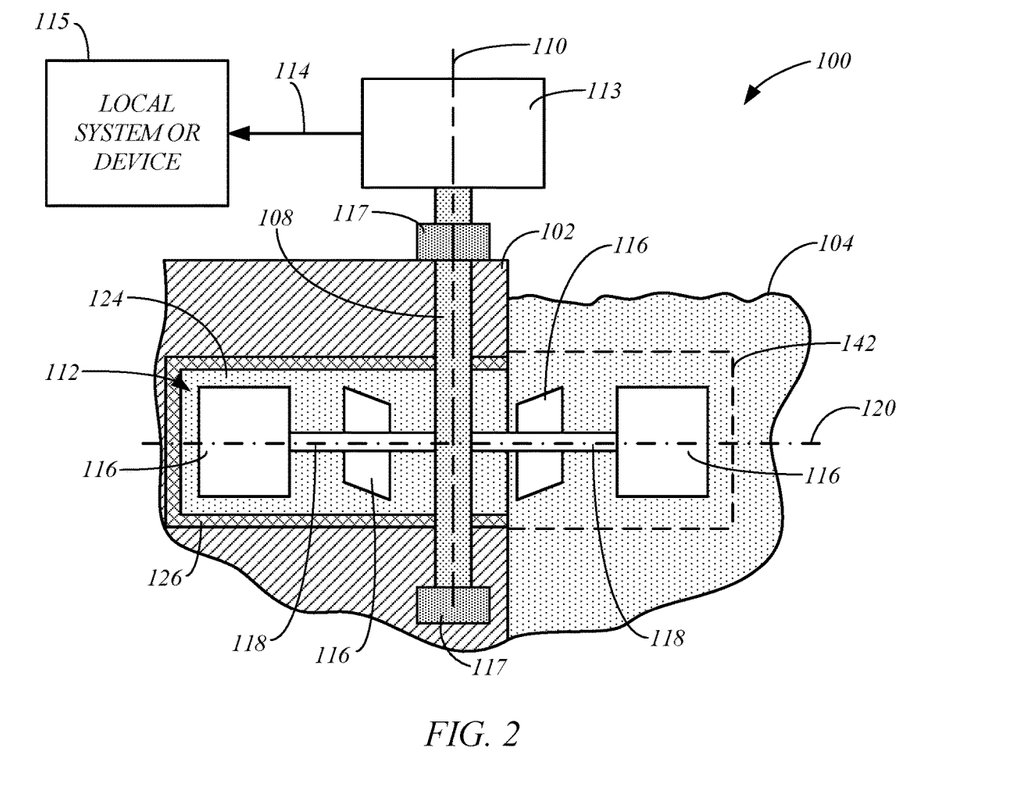
FIG. 2 is a simplified side cross-sectional view of an exemplary hydropower system installed along a bank of a water flow, in accordance with embodiments of the present disclosure.

FIGS. 1 and 2 respectively are simplified top and side cross-sectional views of an exemplary hydropower system 100, in accordance with embodiments of the present disclosure. The system 100 is installed along a bank 102 of water 104, which is flowing as indicated by arrows 106 in FIG. 1, to generate clean electricity with minimal impact on the environment, such as a minimal audible and visible impact, and minimal impact on sediments and fish in the water 104, for example. As used herein, the term bank 102 may represent a bank of a river or channel, or another structure in which the system 100 may be installed, such as a bridge pier, sidewalls of existing hydraulic structures including a bridge abutment, a spillway, or another structure along a water flow 106, for example.

The system 100 harnesses the kinetic energy of the flowing water 106, to drive rotation of a shaft 108 about a vertical axis 110 using one or more hydrokinetic devices 112. The rotation of the shaft 108 may be used to drive an electrical generator 113 to generate electrical energy, which is represented by arrow 114 (FIG. 2). While the shaft 108 is illustrated as being directly connected to the generator 113, it is understood that the rotation of the shaft 108 may be used to drive the electrical generator 113 through a mechanical linkage, which may include one or more different shafts, gears, and/or other components, for example. Thus, the one or more hydrokinetic devices 112 may be used to convert the kinetic energy of the water flow 106 into electrical energy 114.

The electrical generator 113 can be formed in accordance with conventional electrical generators, and may include a gearbox to drive rotation of the electrical power generating components of the electrical generator 113 in response to rotation of the shaft 108. In some embodiments, the electrical generator 113 is positioned above the level of the water 104, such as above the surface of the bank 102, as shown in FIGS. 1 and 2. This reduces the risk of failure from submersion in water, reduces the cost of the electrical generator 113, and simplifies maintenance of the electrical generator 113.

The hydropower system 100 may be deployable in a variety of natural environments requiring local production of electricity, such as in fragile remote ecosystems to rural communities in under-developed countries, for example. The electrical power output 114 may be used to supply power to a local system or device 115, such as a building, an environmental monitoring device (e.g., sensor), lighting, water monitoring or treatment station, sound bubble strobe barrier for invasive carp or other species, and/or other systems or devices. The power output 114 may also be used to supply power to an electrical power distribution system (i.e., the electrical grid).

In some embodiments, the hydrokinetic device 112 is attached to the shaft 108 below the surface of the water 104. The depth of the one or more hydrokinetic devices 112 within the water 104 may be set to avoid floating obstacles, such as canoes, tree branches, ice, etc. Additionally, the one or more hydrokinetic devices 112 may be positioned well above the base over which the water 104 flows (e.g., a river bed) to avoid interaction with erodible sediment layers.

In some embodiments, the hydrokinetic device 112 includes a plurality of flow capture blades 116 that are attached to the shaft 108, and are angularly displaced from each other around the axis 110. In some embodiments, the blades 116 are attached to the shaft 108 using one or more support members 118. The shaft 108 may be supported by one or more bearings 117 that facilitate rotation of the shaft 108 about the axis 110. The support members 118 displace the blades 116 radially from the shaft 108 and the vertical axis 110, which may be coaxial to the shaft 108. Embodiments of the one or more support members 118 include a wheel (FIG. 1), radial arms (FIG. 2), or another suitable support member.

In some embodiments, a horizontal plane 120, which is perpendicular to the axis 110 extends through each of the plurality of blades 116 and the one or more support members 118, as shown in FIG. 2. In some embodiments, each of the blades 116 extends along a vertical plane 122 that is substantially perpendicular (e.g., ±10°) to the horizontal plane 120 and substantially parallel (e.g., ±10°) to the central axis 110, as shown in FIG. 1.

In some embodiments, the weight of the hydrokinetic device 112 is substantially counterbalanced by the buoyancy of the hydrokinetic device 112. For example, at least some of the support members 118 and/or the blades 116 may include sealed cavities of air that control the buoyancy of the hydrokinetic device 112. This eliminates, or at least reduces, the stresses that would otherwise be imposed on the shaft 108 and the bearings 117, to thereby increase the lifespan of the components. In some embodiments, the buoyancy of the hydrokinetic device 112 can be adjusted based on its desired depth in the water 104.

In some embodiments, the shaft 108 is positioned at the edge of the bank 102 or within the bank 102. A cavity 124, which receives the water 104, is formed in the bank 102 to accommodate a portion of the hydrokinetic device 112, such as approximately half, or 50-70% of the device 112, for example, while the remaining portion of the hydrokinetic device 112 extends into the flowing water 106. The cavity 124 may be defined by walls 126 (e.g., top, side, and/or bottom walls) formed, for example, using concrete, steel, and/or other suitable materials, as shown in FIG. 2. The walls 126 defining the cavity 124 may also be used to support the shaft 108 and other components of the system 100.

The blades 116 that extend into the flowing water 104 from the bank 102 (hereinafter "exposed blades"), are exposed to the water flow current 106, while the blades 116 that are within the cavity 124 (hereinafter "sheltered blades"), are sheltered from the currents 106 due to their temporary position within the cavity 124. That is, the sheltered blades 116 are at least partially protected from the currents 106 by the bank 102 and/or the walls 126 that form the cavity 124.

High pressure on the upstream side of the exposed blades 116, which is generated by the water flow 106 pushing against the blades 116, generates a torque that is normal to the vertical axis 110. A counter-torque applied to the sheltered blades 116 within the cavity 124 due to, for example, drag on the sheltered blades 116, is less than the driving force because the sheltered blades 116 are not exposed to the water flow 106. This results in a net torque that drives rotation of the hydrokinetic device 112 and the shaft 108 about the axis 110 in the direction indicated by arrow 128 (FIG. 1).

Figure 3:
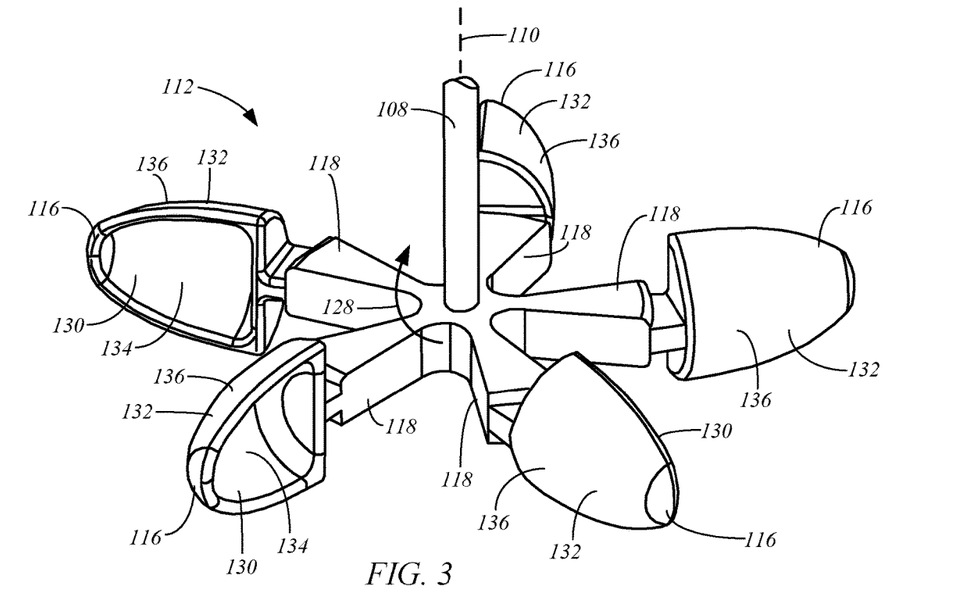
FIGS. 3 and 4 are isometric views of exemplary hydrokinetic devices, in accordance with embodiments of the present disclosure.
Figure 4:
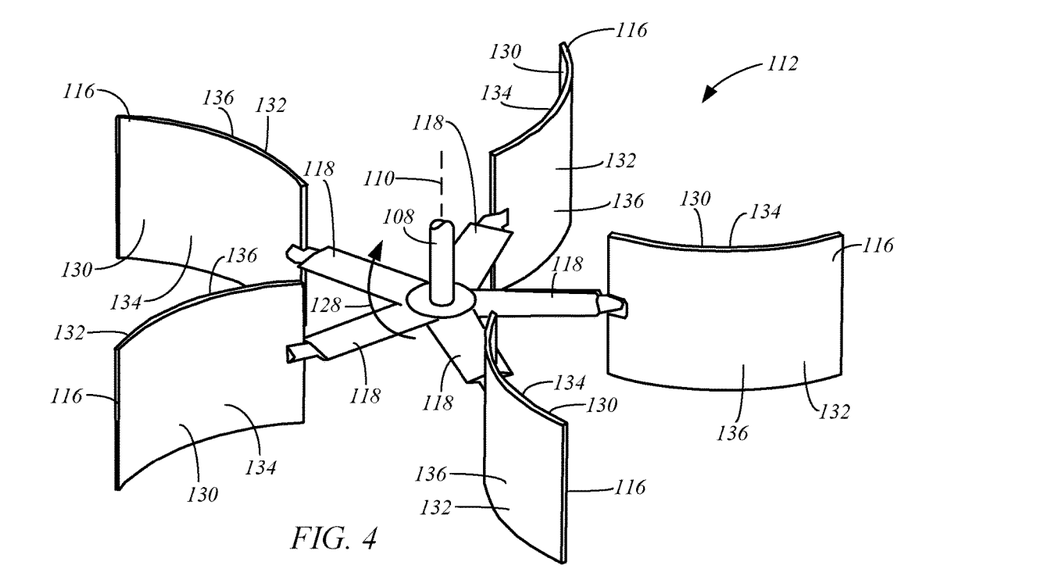

The blades 116 may be configured to enhance the net torque that is generated by the device 112 on the shaft 108. FIGS. 3 and 4 are isometric views of hydrokinetic devices 112, each having exemplary blades 116, in accordance with embodiments of the present disclosure. In some embodiments, the blades 116 have a large surface area to harness the kinetic energy of the water flow 106. In some embodiments, each of the blades 116 has a high drag trailing side 130 and a low drag leading side 132 relative to the rotational direction 128, at which the device 112 is rotated in response to the water current 106 (FIG. 1). The high drag trailing side 130 is configured to capture kinetic energy from the current 106, while the low drag leading side 132 is configured to efficiently pass through the water 104. In some embodiments, the high drag trailing side 130 includes a concave surface 134, and the low drag leading side 132 includes a convex surface 136. In some embodiments, the blades 116 are cupped members (e.g., Pelton blades), as shown in FIG. 3.

Figure 5:
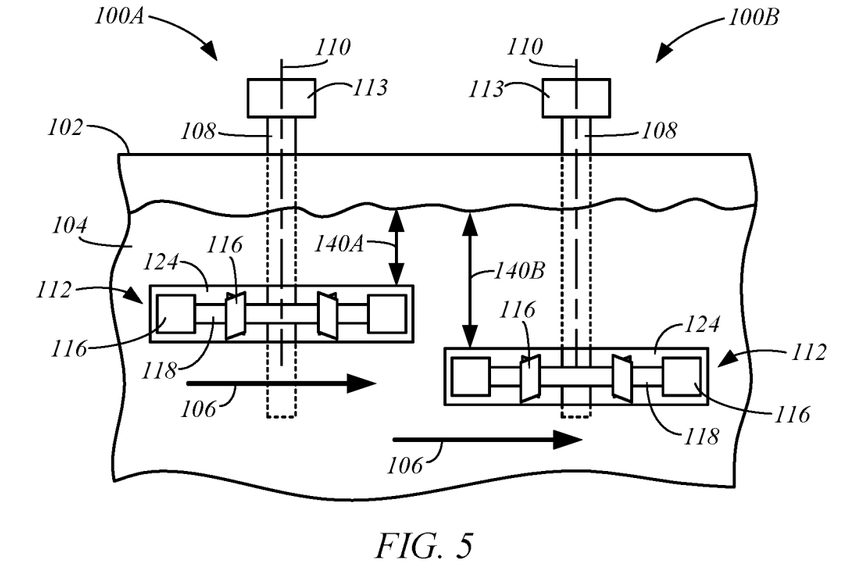
FIGS. 5 and 6 are simplified side views of exemplary hydropower systems installed along a bank of a river, in accordance with embodiments of the present disclosure.
Figure 6:
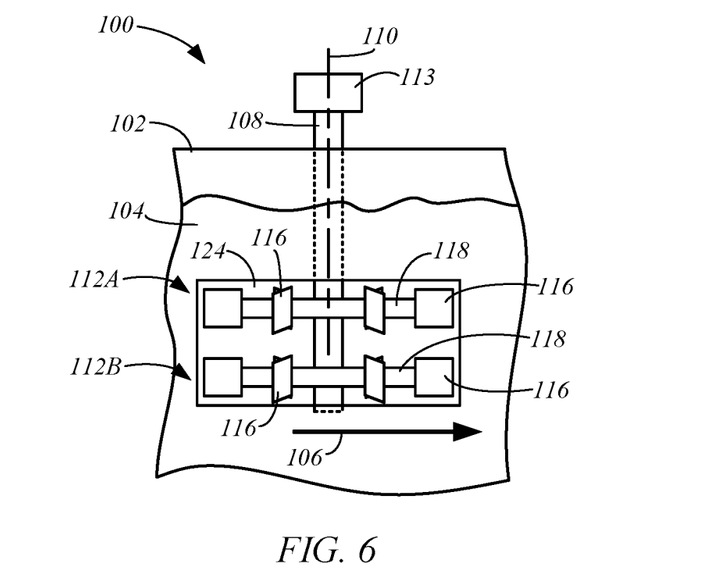

In some embodiments, the hydropower system 100 includes two or more of the hydrokinetic devices 112 along the bank 102 that are used to power one or more electrical generators 113. FIGS. 5 and 6 are simplified side views of exemplary hydropower systems installed along a bank 102 of a river, in accordance with embodiments of the present disclosure. In some embodiments, the devices 112 are positioned at different depths within the water 104. This allows the system 100 to use currents 106 that are substantially uninhibited by upstream hydrokinetic devices 112. Thus, the system 100 can extract more energy from the river 104 than would otherwise be possible if the multiple hydrokinetic devices 112 were positioned at the same depth along the bank 102.

In one embodiment, multiple hydropower systems, such as systems 100A and 100B, are installed on a bank 102, as shown in FIG. 5. The hydropower system 100A includes at least one hydrokinetic device 112 that is installed at a depth 140A in the water 104. The hydropower system 100B includes at least one hydrokinetic device 112 that is installed at a depth 140B in the water 104 that is different from the depth 140A. This allows the one or more hydrokinetic devices 112 of the downstream system 100B to capture stronger currents 106 than would be available if the depths 140A and 140B were the same.

In accordance with another embodiment, the hydropower system 100 includes multiple hydrokinetic devices 112, as shown in FIG. 6. For example, the system 100 may include hydrokinetic devices 112A and 112B that are located at different depths within the river 104. This allows each of the hydrokinetic devices 112 to capture the full currents 106.

In some embodiments, the exposed blades 116 may be protected from, for example, debris in the water 104 or objects falling from above the blades 116, by shielding 142, such as a wire mesh, horizontal shrouded disk, or another suitable shielding, as indicated in FIG. 2. The shielding 142 may also prevent debris from entering the cavity 124. Such shielding 142 can also block fish and other aquatic species from engaging the blades 116 and entering the cavity 124. However, since the exposed blades 116 travel at approximately the same velocity of the current 106, fish and other aquatic species should be capable of maneuvering around the exposed blades 116 without any issues.

In some embodiments, the shielding 142 surrounds the exposed hydrokinetic device 112 and the opening to the cavity 124. In other embodiments, the shielding 142 is positioned on the upstream side of the exposed hydrokinetic device 112, while shielding for the remaining sides of the exposed hydrokinetic device 112 may or may not be provided.

Figure 7:
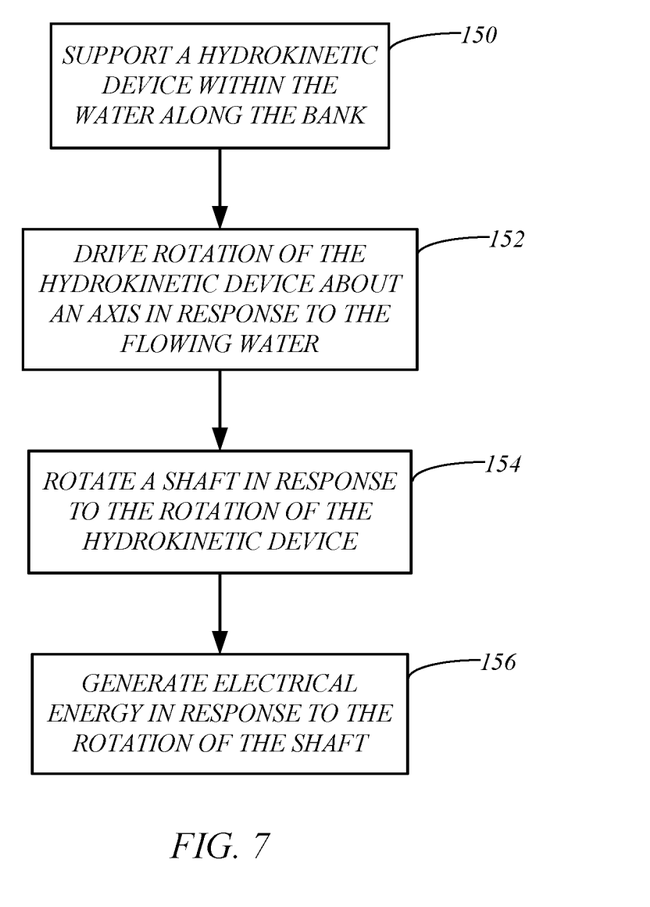
FIG. 7 is a flowchart illustrating an exemplary method of using a hydropower system to generate electrical energy from water flowing along a bank, in accordance with embodiments of the present disclosure.

Additional embodiments are directed to methods of using the system 100 to generate electrical energy from water 104 flowing along a bank 102. FIG. 7 is a flowchart illustrating an example of such a method, in accordance with embodiments of the present disclosure.

At 150, at least one hydrokinetic device 112 formed in accordance with one or more embodiments described herein is supported within the water 104 along a bank 102, such as shown in FIGS. 1, 2, 5 and 6. A portion of the device 112 is submerged in the water 104 within a cavity 124 formed in the bank 102, and a portion of the device 112 extends outside the cavity 124 and is submerged in the flowing water 106.

At 152, rotation of the hydrokinetic device 112 is driven about an axis 110 in response to the flowing water 106, which pushes on the exposed blades 116 of the portion of the device 112 located outside the cavity 124. At 154, A shaft 108 attached to the hydrokinetic device 112 is rotated in response to the rotation of the device 112. Electrical energy 114 (FIG. 2) is generated using an electrical generator 113 at 156, in response to the rotation of the shaft 108.

The installation of the hydropower system 100 along a bank 102 of a river, can provide additional benefits beyond the generation of electrical power. In some embodiments, the hydropower system 100 is installed in the outer bank 102 (e.g., the outside portion of a bend), as indicated in FIG. 1. Such a location takes advantage of faster currents 106 (indicated by larger arrows), while providing a benefit of reducing bank erosion. For example, as the hydropower system 100 captures the kinetic energy of the flowing water 106 using the hydrokinetic device 112, the kinetic energy of the river current 106 is reduced at the bank 102 in which the system 100 is installed. This reduces the velocity of the currents 106 at the bank 102 downstream of the device 112, as indicated in FIG. 1, which reduces erosion of the bank 102. Thus, the system 100 can be used to provide stability and protection to natural river banks by extracting energy from the river and reducing near-bank water currents 106.

Although the embodiments of the present disclosure have been described with reference to preferred embodiments, workers skilled in the art will recognize that changes may be made in form and detail without departing from the spirit and scope of the present disclosure.

What is claimed is:

1. A hydropower system for generating electrical energy from water flowing along a bank comprising:
a shaft configured to rotate about a vertical axis;
an electrical generator configured to generate electrical energy in response to rotation of the shaft; and
a first hydrokinetic device including a plurality of blades attached to the shaft and angularly displaced from each other around the axis;
wherein:
a portion of the first hydrokinetic device is submerged in the water within a cavity formed in the bank, and
a portion of the first hydrokinetic device extends outside the cavity and is submerged within the flowing water; and
the flowing water pushes on the blades located outside the cavity, which drives rotation of the first hydrokinetic device and the shaft about the axis.

2. The system of claim 1, wherein the first hydrokinetic device includes one or more support members attached to the shaft, the one or more support members radially displacing the plurality of blades from the shaft.

3. The system of claim 2, wherein a horizontal plane extending perpendicularly to the axis extends through each of the plurality of blades and the one or more support members.

4. The system of claim 3, wherein each of the plurality of blades extends along a vertical plane that is substantially perpendicular to the horizontal plane and substantially parallel to the axis.

5. The system of claim 4, wherein each of the blades includes a high drag trailing side and a low drag leading side relative to a direction of rotation of the first hydrokinetic device and the shaft in response to the flowing water.

6. The system of claim 5, wherein each of the high drag trailing sides includes a concave surface, and each of the low drag leading sides includes a convex surface.

7. The system of claim 1, wherein the cavity shields the blades of the first hydrokinetic device within the cavity from the flowing water.

8. The system of claim 1, wherein:
the system comprises a second hydrokinetic device attached to the shaft a location that is displaced along the axis from the first hydrokinetic device, the second hydrokinetic device including a plurality of blades attached to the shaft;
a portion of the second hydrokinetic device is submerged in the water within the cavity, and a portion of the second hydrokinetic device extends outside the cavity and is submerged within the flowing water; and
the flowing water pushes on the blades of the portion of the second hydrokinetic device located outside the cavity, which drives rotation of the second hydrokinetic device and the shaft about the axis.

9. The system of claim 1, further comprising one or more bearings supporting the shaft for rotation about the axis.

10. The system of claim 1, further comprising shielding extending from the bank and into the flowing water, the shielding configured to protect the blades extending outside the cavity from debris within the flowing water.

11. The system of claim 10, wherein the shielding is configured to block debris in the flowing water from entering the cavity.

12. A method of generating electrical energy from water flowing along a bank comprising:
supporting a first hydrokinetic device having a plurality of blades within the water along the bank, wherein a portion of the first hydrokinetic device is submerged in the water within a cavity formed in the bank, and a portion of the first hydrokinetic device extends outside the cavity and is submerged within the flowing water;
driving rotation of the first hydrokinetic device about a vertical axis in response to the flowing water pushing on the blades of the portion of the first hydrokinetic device located outside the cavity;
rotating a shaft attached to the first hydrokinetic device in response to driving rotation of the first hydrokinetic device; and
generating electrical energy using an electrical generator in response to the rotation of the shaft.

13. The method of claim 12, further comprising radially displacing the blades of the first hydrokinetic device from the shaft using one or more support members attached to the shaft.

14. The method of claim 12, further comprising shielding the blades of the portion of the first hydrokinetic device within the cavity from the flowing water using the cavity.

15. The method of claim 14, wherein:
a horizontal plane extending perpendicularly to the axis extends through each of the plurality of blades and the one or more support members; and
each of the plurality of blades extends along a vertical plane that is substantially perpendicular to the horizontal plane and substantially parallel to the axis.

16. The method of claim 15, wherein:
each of the blades includes a high drag trailing side comprising a concave surface and a low drag leading side comprising a convex surface relative to a direction of rotation of the first hydrokinetic device and the shaft; and
driving rotation of the first hydrokinetic device comprises capturing kinetic energy of the flowing water using the high drag trailing side of the blades.

17. The method of claim 16, further comprising reducing erosive forces along the bank comprising reducing a velocity of the water flowing along the bank in response to driving rotation of the first hydrokinetic device about the vertical axis.

18. The method of claim 14, further comprising driving rotation of the shaft using a second hydrokinetic device attached to the shaft a location that is displaced along the axis from the first hydrokinetic device using the flowing water, the second hydrokinetic device including a plurality of blades attached to the shaft.

19. The method of claim 18, wherein:
a portion of the second hydrokinetic device is submerged in the water within the cavity, and a portion of the second hydrokinetic device extends outside the cavity and is submerged within the flowing water; and
driving rotation of the shaft using the second hydrokinetic device comprises pushing the blades of the portion of the second hydrokinetic device located outside the cavity using the flowing water.

20. The method of claim 12, further comprising protecting the blades of the portion of the first hydrokinetic device extending outside the cavity using shielding extending from the bank.

* * * * *